(12) United States Patent
Schaeffer

(10) Patent No.: US 7,150,704 B2
(45) Date of Patent: Dec. 19, 2006

(54) DEVICE FOR WALKING OR RUNNING IN PLACE

(76) Inventor: Albert Schaeffer, Lindgreenstr. 37, Bickenbach (DE) 64404

( * ) Notice: Subject to any disclaimer, the term of this patent is extended or adjusted under 35 U.S.C. 154(b) by 7 days.

(21) Appl. No.: 10/266,248

(22) Filed: Oct. 8, 2002

(65) Prior Publication Data
US 2003/0119634 A1    Jun. 26, 2003

(30) Foreign Application Priority Data
Oct. 8, 2001  (DE)  ................. 101 49 491

(51) Int. Cl.
*A63B 71/00*  (2006.01)
(52) U.S. Cl. .................. 482/148; 472/59; 472/57; 472/48
(58) Field of Classification Search ............ 482/148, 482/142, 907, 74–75, 79, 27; D21/662, 668; 434/247; 472/57, 48, 85, 62, 59
See application file for complete search history.

(56) References Cited

U.S. PATENT DOCUMENTS

| | | | |
|---|---|---|---|
| 145,145 A | * | 12/1873 | Baggs ................. 119/69.5 |
| 3,451,526 A | * | 6/1969 | Fernandez .......... 198/370.03 |
| 4,107,830 A | * | 8/1978 | Thomson ................ 29/110.5 |
| 4,826,159 A | * | 5/1989 | Hersey ................... 272/146 |
| 5,643,182 A | * | 7/1997 | Engel ..................... 601/119 |
| 5,944,166 A | * | 8/1999 | Bidaud .................. 198/465.1 |
| 6,017,297 A | * | 1/2000 | Collins ................... 482/146 |
| 6,123,647 A | | 9/2000 | Mitchell |
| 6,152,854 A | | 11/2000 | Carmein |

FOREIGN PATENT DOCUMENTS

WO    WO 96/35481    11/1996

\* cited by examiner

*Primary Examiner*—Lori Amerson
(74) *Attorney, Agent, or Firm*—Klaus P. Stoffel; Wolff & Samson PC

(57) ABSTRACT

A device for walking or running in place, especially for virtual spaces in which two transport elements crossing each other at a right angle are provided, which together form a walkable central surface, on which a user walks forward, whereas, under him, the transport elements move at the same speed. It is essential that the transport elements consist of rows of square plates or tiles, which can be moved in rows in the X and Y directions, where at all times a row of tiles is removed by a transfer device and then shifted by 90° or 180°.

13 Claims, 4 Drawing Sheets

DEVICE FOR WALKING OR RUNNING IN PLACE

The invention pertains to a device for walking or running in place, especially in virtual spaces, according to the introductory clause of claim 1.

A device using one or two moving walkways, which serve to keep the user walking on the walkway in the same place, is known from WO 96/35,481. That is, as the user is walking at a certain speed in the longitudinal direction of the walkway, the walkway itself travels in the opposite direction at the same speed, with the result that the user walks or runs in place. A sensing device for detecting the movement of, for example, the user's foot is used in conjunction with an evaluation device to adjust the speed of the transport element. The user cannot change the direction in which he is walking. A design with several roller conveyors which are arranged in a star-like pattern with respect to each other and which always bring the user back to a central position can also be derived from this publication. This device is highly complex in its design, and the transport by, or the walking on, the roller conveyors is quite jerky. In addition, there is no possibility of using the bottom surface for the projection of images.

Devices for running in place, each of which consists of a moving walkway, which is made up in turn of several conveyors moving in the transverse direction, are known from U.S. Pat. No. 6,123,647 A and U.S. Pat. No. 6,152,854 A. The design of this device is relatively complex and does not make it possible for virtual scenes to be projected through the floor structure.

The task of the invention is therefore to provide a device of the general type indicated above which can serve optimally as the floor of a CAVE with projection through the floor.

This task is accomplished by a device of the general type indicated above with the characterizing features of claim 1. Advantageous embodiments of the invention are characterized in the subclaims.

The device according to the invention thus consists of two horizontal, movable transport elements, which cross each other at a right angle and which together form a walkable central surface. The transport direction and transport speed of these elements are actuated in correspondence with the walking movements of the user located in the middle in such a way that the user always remains in the same place. The user is equipped with a so-called tracking system, by means of which a linked computer continuously determines, or receives data concerning, his exact position. When the user now moves exactly in the direction in which the belt-conveyor-like transport elements move, i.e., to the left or to the right, in the X or Y direction, or forward or backward, he is always brought back by transport movements acting in the opposite direction. If he is not walking exactly in one of the cited directions, the computer will determine the stages by which he can be brought back to one of these directions and then executes these stages accordingly. It is essential to the invention that the transport elements are formed by loose, square plates, which are aligned in the X and Y directions. These plates are referred to below as "tiles". The transport tiles are arranged in rows on an essentially cross-shaped floor plate, over which they are able to slide easily. When the rows of tiles move, the individual tiles slide along the plate, which ensures the stability and walkability of the surface. Each time a row of tiles has been pushed out, it can be inserted by a transfer device back into the empty row which has formed on the opposite side.

According to an advantageous embodiment, the tiles and the bottom plate are made of a transparent, stable, easy-sliding material such as glass or Plexiglas (acrylic), as a result of which it is possible to project a picture onto or through the floor or walking surface.

To facilitate the sliding of the transport tiles on the bottom plate, small elevations can be provided on their contact surfaces, or a sheet of friction-reducing material can be provided between the tiles and the bottom plate (with a sealing effect in the upward direction). It is also possible to provide a system of rails or the like. Guide bars can also be provided along the corresponding edges of the cross to prevent the tiles from slipping off the sides of the cross-shaped bottom plate.

It is highly advantageous to use at least one pivoting transport ring as the transfer device. This ring works together with pushing devices and is located in the plane of or parallel to the walking surface. Each transport ring accepts one row of pushed-out tiles and after rotating them 90° or 180° makes them available again to a transport element. Support surfaces are provided on the transport ring, each of which is designed to accept one row of tiles; a total of four support surfaces is therefore provided, which are arranged diagonally opposite each other, corresponding to the basic transport directions X and Y.

It as advantageous to use two transport rings, which are parallel to each other and which need to pivot by only 90° to transfer the tiles, the transporting ring in question being raised or lowered as appropriate. As a result, the tiles can be returned to service almost twice as quickly than would be the case if only one transport ring were used, which had to pivot a full 180°.

Because the tile supports of the transport rings are designed as straight support benches, it is advantageous for the four tile supports of each ring to be connected to each other by straight struts, as a result of which octagonal transport rings are obtained.

Instead of transport rings, it is also possible according to the invention to provide transport arms, which intersect each other in the manner of a transport cross, at the end of each of which a support surface for one row of tiles is present. The transport cross in this case is installed underneath and parallel to the bottom plate and is designed so that it can be rotated and lowered.

The pushing devices which cooperate with the transport rings or crosses can be designed as rakes and, during the outward-pushing phase, they can slide in a direction parallel to the bottom plate, either on it or a short distance away from and parallel to it. They are also arranged diagonally opposite each other, each one being assigned to one of the four tile supports of the transport rings, and preferably attached to the upper ring of a support framework. The pushing devices are designed as rakes or combs, so that the small plates or tiles are or can be protected at all times during the rotation process by a small blockade [blocker?—Tr. Ed.], always located exactly at the edge between two tiles and the transport ring [Where? Best we can do with this sentence; no picture to help!—Tr. Ed.].

The pushing device, however, can also be a roll, and it could also be seated on top at a 90° angle. The tiles arranged in rows to form a flat cross will always be pushed forward or backward in rows in the direction opposite that in which the user is walking; they will be collected on the opposite side, that is, accepted by the opposing tile support of the transport ring, and returned to the active pusher rake, that is, to the starting position of the pushing device, by the ring, which pivots to the appropriate degree.

The area actually used, that is, the center of the walking surface, can be predefined in various ways by the computer; for example, it can be defined as a circle, within which the user must stay at all times. The conveyor does not move until the user leaves the circle or proceeds beyond a certain radius. It is also possible, however, to provide a genuine center point, in which case the conveyor starts to move as soon as the user standing in the center of the conveyor moves or walks along the surface, thus bringing him immediately back to the center and keeping him there.

In a preferred application of the device according to the invention, the walking surface of the device forms the floor of the virtual space of a so-called CAVE (Computer-Aided Virtual Environment). A CAVE is basically a large cube, onto the surfaces of which, especially onto the sides of which, images are projected. The user inside the CAVE has the feeling that he is in a virtual world. The location of the user in the virtual space of the CAVE is changed primarily by the changing of the entire scene; that is, the user "flies" through the scene under the control of an input device such as a joystick, a data glove, or a 3D mouse, supported, it is true, by the computer but limited in reality to the confined space in the CAVE. That is, the user will walk into one of the projection walls if he takes more than a few steps. This means that it is impossible to walk freely in the CAVE, and this lack of freedom can be perceived as very negative especially in the case of applications which are not static, such as those which involve walking through a virtual building. In addition, it is necessary to operate the input device in a carefully graduated manner, which requires a certain learning period and a certain amount of practice, which is not available to short-term or one-time users. It is not possible to move naturally in a CAVE of the known design with a stationary floor.

The use of the walking device according to the invention as the floor of a CAVE serves in particular to enhance the perception of the virtual reality represented in the CAVE, namely through the additional aspect of real walking. The user moves through the device in the "artificial world" of the CAVE not by means of a so-called 3D mouse, which he holds in his hand and must operate, but rather by the free movement of his own body. The scenery around him changes simply as a result of his own motions and body positions. Depending on the quality of the tracking system, the scenery can even change in response to, for example, the user's attempt to "look around a corner".

To achieve this goal in optimum fashion, the tiles used and the bottom support plate used are transparent, as a result of which the entire walking surface is largely transparent and can serve as the "sixth side" of the CAVE. For the sake of the most realistic possible perception of the virtual scenery presented in the CAVE, it is an enormous advantage if, in addition to providing the user with freedom of movement, it is also possible for the reality being simulated to appear in whatever direction the user looks.

Because it is now possible according to the invention for the user to move actively over relatively long distances in a complete immersion environment, the immense advantages of the CAVE are now also available to the industrial, economic, and public sectors which are dependent on the possibility of active movement and which can now make full use of "virtual reality". Thus, optimal possibilities for the use of the invention in conjunction with a CAVE include:

allowing tourists or architects to walk through virtual buildings;

creating training simulators for firefighters, for example, or the military; and developing virtual products.

The invention is explained in greater detail below on the basis of several exemplary embodiments with reference to the drawing.

Figure 1:
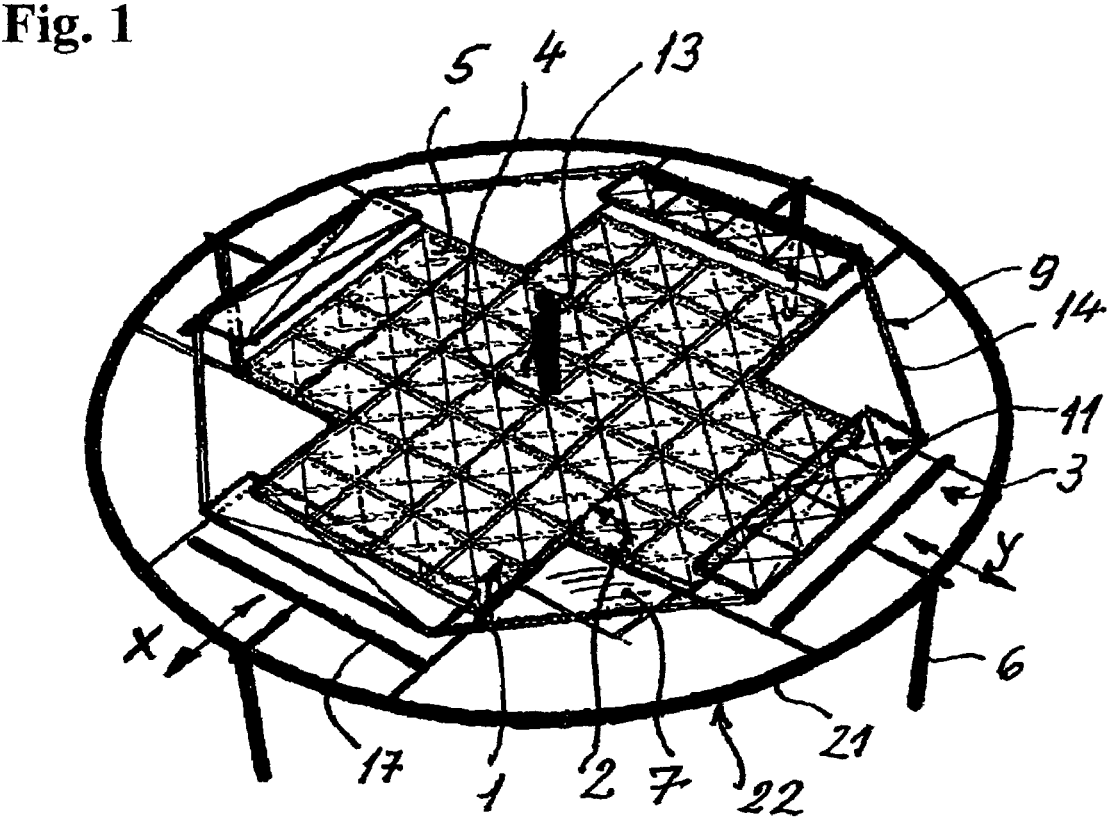
FIG. 1 shows a perspective view of a device in a version with only one transport ring.

In the embodiment shown in FIG. 1, two perpendicular plate conveyors 1, 2 are provided to serve as crossing transport elements, which rest on an essentially cross-shaped bottom plate 3 and form a walkable center surface 4. It can be seen that the conveyors 1, 2 are formed by loose, square plates 5, which are aligned in the X and Y transport directions. They are the so-called "tiles", which can be moved in rows by a transfer device, consisting of an octagonal transport ring 9 and four pushing devices 17, in the corresponding X or Y direction. The transport ring 9 consists of four support benches 11, which are connected to each other by struts 14. Each of these support benches 11 has the approximate length of one row of tiles and the width of one tile. The bottom plate 3 is connected in the manner of a table to a framing ring 21 of a support framework 22 and is supported by several legs 6, which hold the bottom plate 3 at an appropriate distance from the floor of the room. The tiles 5 and the bottom plate 3 are made of transparent material. Underneath the bottom plate 3, a mirror 7 is set up at an angle so that images projected from outside the device can be projected vertically upward and can be seen through the bottom plate and the tiles, so that the user standing on the device sees shadowless images.

Figure 2:
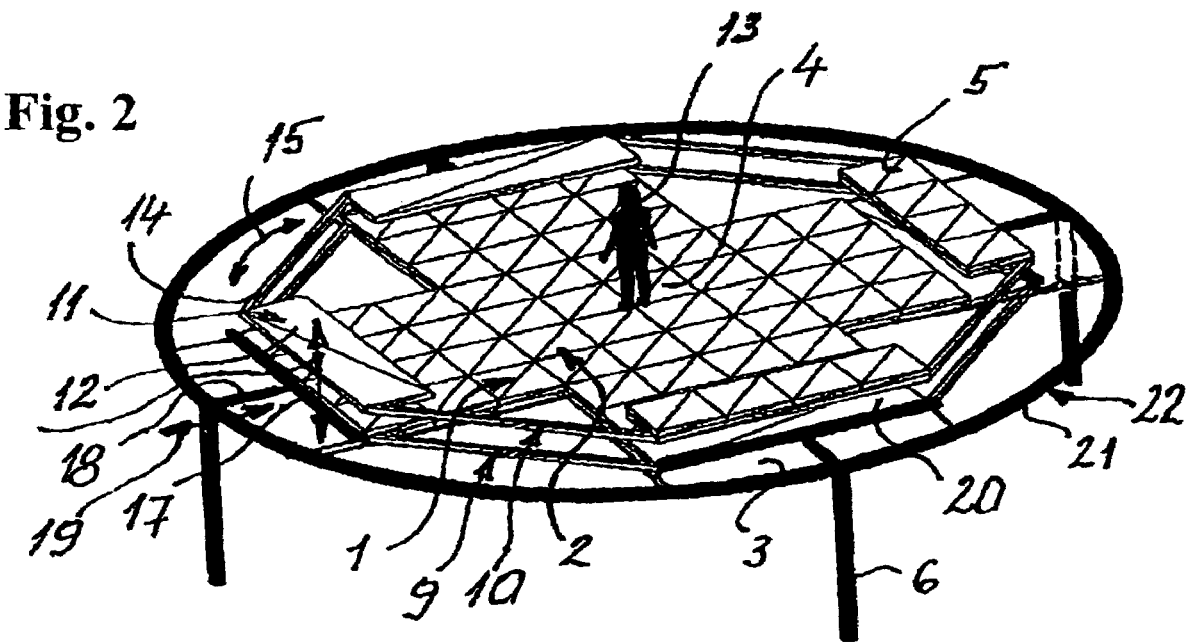
FIG. 2 shows a perspective view of a device in a version with two transport rings.
Figure 3:
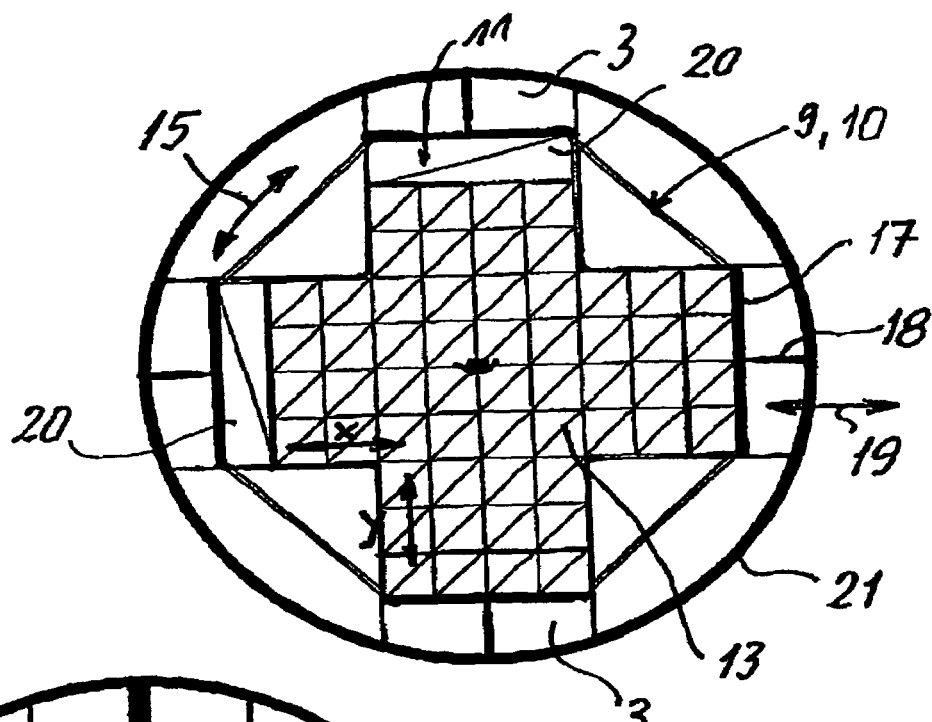
FIG. 3 shows a top view of the device according to FIG. 2 after the pushers have been retracted.
Figure 4:
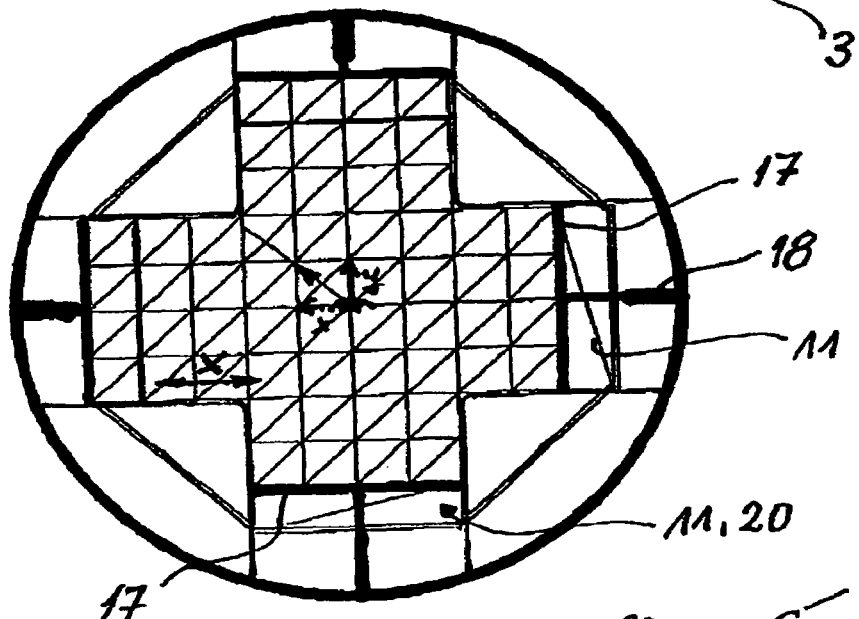
FIG. 4 shows a top view similar to FIG. 3 but with the pushers pushed forward in the X and Y directions.

In the case of the embodiment shown in FIGS. 2–4, two rectangular transport rings 9 and 10, arranged parallel to each other and to the plate 3, are provided as the transfer device. Four support benches 11 with upper surfaces 12 for the rows 5 of tiles are provided in a uniform arrangement on each of these rings, the benches being arranged diagonally opposite each other, and connected to each other by struts 14. The rotational movement 15 and the vertical raising/lowering movement 16 of the transport rings 9 and 10 are indicated by double arrows. In addition, four pushing devices 17 are provided, which work together with the transport rings 9, 10 and the tiles 5 resting on the cross-shaped bottom plate 3. These pushing devices are driven by, for example, linear motors 18 to execute horizontal sliding movements 19 in the plane of the floor plate 3. Thus a row of tiles can be pushed from one of the support benches onto the plate 3, the entire row of tiles being pushed forward by a distance equal to the width of a tile. Simultaneously, a row of tiles is pushed onto the opposite support bench. After the pusher 17 has been retracted, the support ring is pivoted by 90° or 180°, and the row of tiles removed from the opposite side via the support bench is set down into the empty row 20 formed on the first support bench. Thus, as the user 13 on the center surface 4 paces forward, the tiles under him will be pushed in the opposite direction at the same speed, so that it in practical terms he will be walking in place but nevertheless has the impression of making forward progress. The pushing devices 17, 18 are installed on the upper ring 21 of a support framework 22, which also holds the bottom plate and supports the transport rings 9, 10 (not shown). This is especially clear in FIGS. 3 and 5. FIG. 3 shows a situation with rows of tiles being pushed in the X and Y direction, that is, toward the right and downward in the drawing. FIG. 4 in turn shows a situation with two pushers, pushing forward in the X and Y direction, that is, toward the left and upward in the drawing. As a result, one row of tiles is pushed from each full support bench 11, and thus the entire set of tiles located in front of it is pushed forward, the last row of tiles of the set being pushed onto the opposite, empty support bench.

Figure 5:
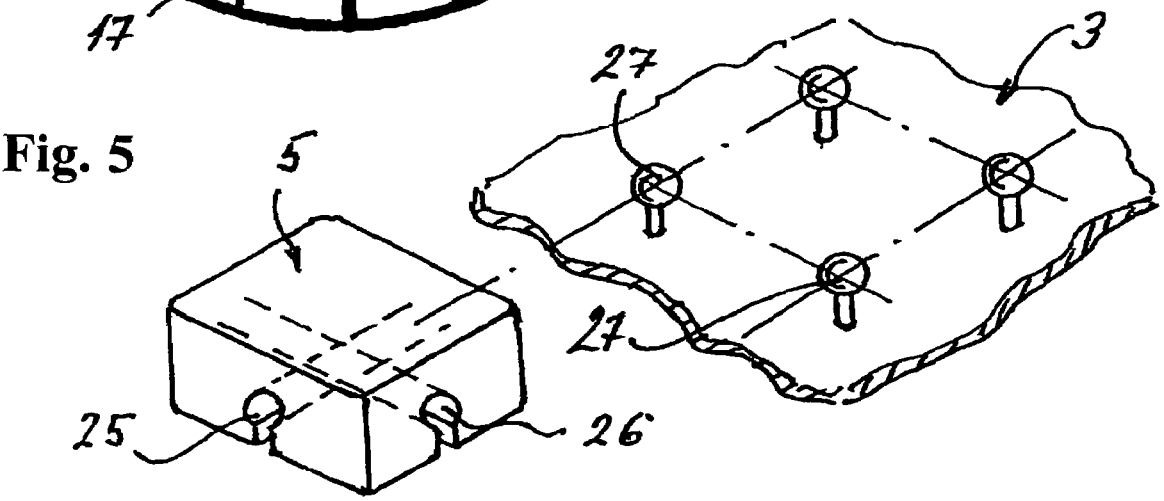
FIG. 5 shows a perspective view of a tile with guide grooves and of a bottom plate with guide pins.

FIG. 5 shows that a tile 5 has two T-shaped guide grooves 25, 26, which cross each other in the middle on the bottom of the tile; mushroom-shaped guide bolts 27 on the top surface of the plate 3 cooperate with these grooves. Guide bolts 27 can also be provided on the support benches 11. They can at least partially prevent the pushers 17 from forcing the tiles to move upward, which is undesirable.

Figure 6:
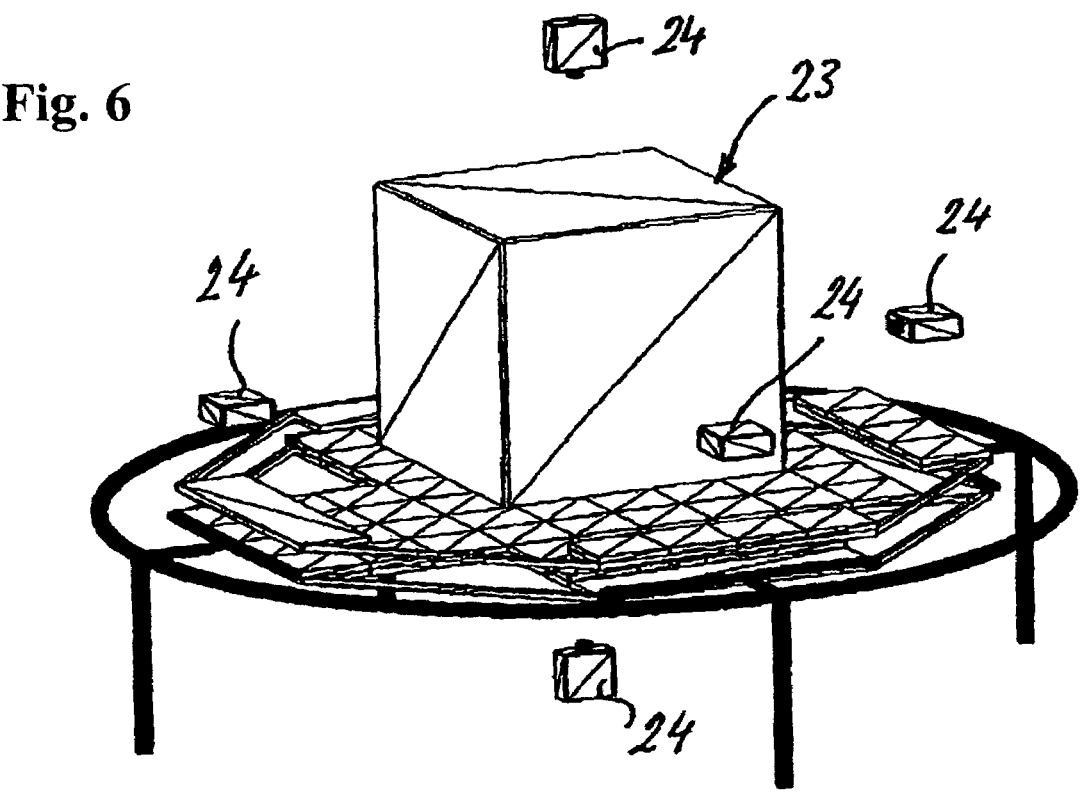
FIG. 6 shows a perspective view similar to FIG. 2 with a CAVE placed in the center of the device.
Figure 7:
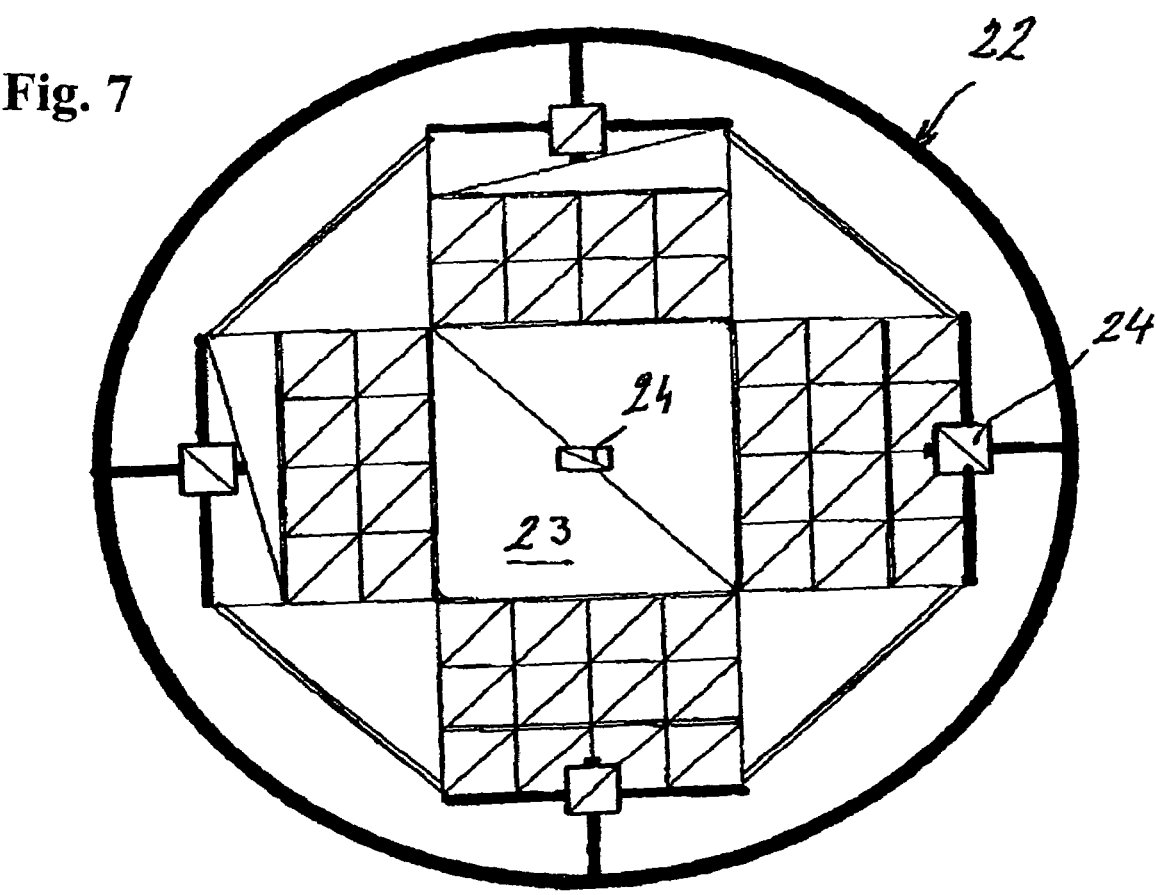
FIG. 7 shows a top view of the device according to FIG. 6.

FIGS. 6 and 7 illustrate an embodiment similar to that of FIGS. 2–4, except that here a CAVE 23 has been installed on the center surface 4 in such a way that this surface forms the floor of the CAVE. A projector 24 is set up an appropriate distance away from each of the six sides of the CAVE 23; these projectors project corresponding images onto the five walls of the CAVE 23 and onto or through the transparent floor of the transport device.

Figure 8:
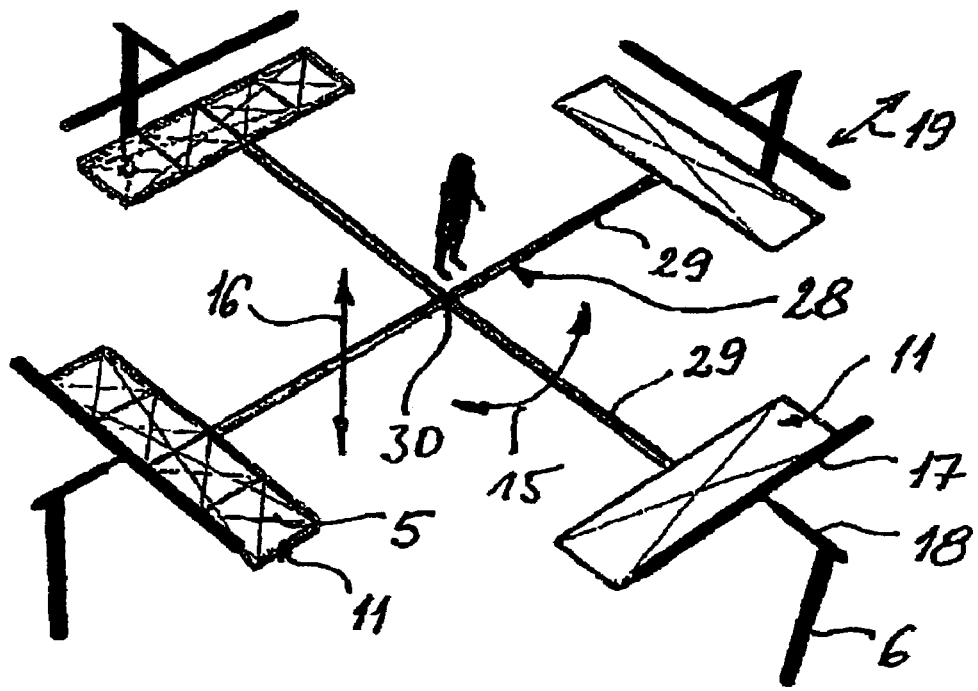
FIG. 8 shows a perspective view of a device with a transport cross and without the rows of tiles and the bottom plate.
Figure 9:
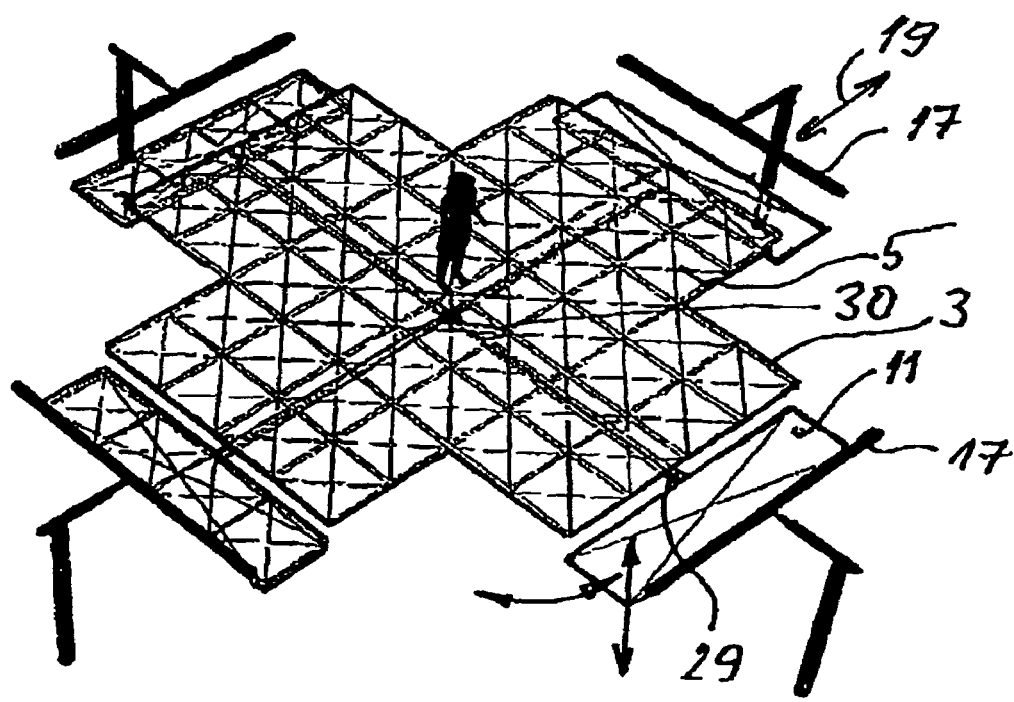
FIG. 9 shows a perspective view of a device according to FIG. 8 with its rows of tiles and the bottom plate.

Finally, FIGS. 8 and 9 show how the four support benches 11 are attached to transport arms 29, which cross each other at a right angle and form a transport cross 28. This cross is located underneath and parallel to the bottom plate 3, on which the rows of tiles are supported. Together with the transport cross 28, the support benches 11 execute rotational movement 15 around the intersection 30 of the transport arms 29 to bring the tiles 5 to a different end of the tile conveyor. So that this rotational movement can be executed and so that the tiles 5 can be pushed onto and off the support benches 11, the transport cross 28 is also able to perform a raising or lowering movement in . . . during . . . [sic; something missing here—Tr. Ed.]. . . the X/Y position of the support benches. The pushing devices 17, 18 attached to the support legs 6, furthermore, are stationary, and only the pusher 17 exerts a pushing action 19 in the X or Y direction to push the tiles from or onto the support benches. [sic; the "only" in this last sentence seems out of place—Tr. Ed.]

LIST OF REFERENCE NUMBERS

1 plate conveyor
2 plate conveyor
3 bottom plate
4 center surface
5 plates, tiles
6 support legs
7 mirror
8 —
9 transport ring, octagonal
10 transport ring
11 support benches
12 support surface
13 user
14 struts
15 rotational movement
16 raising/lowering movement
17 pushing device
18 linear motor
19 pushing device
29 empty row
21 frame ring
22 support framework
23 CAVE
24 projectors
25 guide grooves
26 guide grooves
27 guide bolts
28 transport cross
29 transport arms
30 intersection

What is claimed is:

1. A device for walking or running in place, comprising: two horizontal transport elements arranged so as to cross each other at a right angle to form an accessible center surface, the transport elements being actuable in relation to a user's speed and being actuable in relation to a user's direction of movement, respectively, in correspondence with walking movements of the user located on the center surface; a tracking system carried along by the user so that the user always remains in the same place, the transport elements including square tiles aligned along X and Y coordinates or in the movement direction, which tiles are not connected to each other and are movable in rows in the X and Y direction in a sliding manner on a base plate; and a conveyor device operative to push out a row of tiles and insert the pushed-out tiles back into an empty row resulting from movement of the tiles.

2. A device according to claim 1, wherein the tiles and the base plate are made of a transparent, stable, easy-sliding material.

3. A device according to claim 1, wherein the base plate is made of one of glass and plexiglass.

4. A device according to claim 1, wherein the base plate is formed as a cross with projecting crossarms, and further comprising guide bars which are provided along side edges of the projecting crossarms to prevent the tiles from falling off.

5. A device according to claim 1, wherein the conveyor device includes at least one pivoting transport ring which is one of planar to and parallel to the center surface, the transport ring includes a support bench with a support surface, the benches corresponding to the transport directions and facing each other from opposite sides, each bench being configured to accept one row of pushed-out tiles, so that this row, after a rotation by 180 or 90, can start to be pushed in the transport direction again.

6. A device according to claim 5, wherein two transport rings, which are parallel to each other, are provided so that each of the rings needs to be pivoted by only 90° to transfer the tiles, the respective transport ring in question being raisable or lowerable appropriately.

7. A device according to claim 5, wherein the transport ring has four straight support benches that are connected to each other by straight struts so as to form an octagonal transport ring.

8. A device according to claim 1, wherein the conveyor device includes crossed transport arms arranged to form a transport cross and a tile support bench provided at each end of each arm.

9. A device according to claim 5, wherein the conveyor device includes rakes arranged to push the tiles so that when they push the tiles from the benches the rakes slide in a direction parallel to the base plate, the rakes being arranged to one of slide on the base plate itself and move parallel to and a slight distance away from the base plate.

10. A device according to claim 9, and further comprising a support framework having a framing ring that supports the base plate, four pushers being arranged diagonally opposite each other on the framing ring of the support framework.

11. A device according to claim 1, wherein the tiles have bottom surfaces with T-shaped guide grooves which cross each other in a center of the tile, the conveyor device having support benches, the base plate and the support benches having top surfaces with mushroom-shaped guide bolts that cooperate with the T-shaped guide grooves.

12. A device according to claim 1, wherein the center surface forms a floor of a computer aided virtual environment.

13. A device for walking or running in place, comprising a support framework having a bottom plate; two horizontally movable transport elements arranged to cross each other at a right angle and form a walkable center surface, said center surface being movable in an X or Y direction and at a variable speed, said direction and speed of movement of said center surface being respectively actuable in correspondence with walking movements of a user located on said center surface; a tracking system carried along by a user for maintaining a users position on said center surface, said transport elements including square tiles arranged unconnected to one another and aligned along X and Y coordinates on the bottom plate, said tiles being arranged to rest on said bottom plate and being slidably pushable into rows in the X and Y direction; and a conveyor device arranged to push out a row of said tiles and operatively arranged to insert a row of said tiles into an empty row resulting from movement of the tiles.

* * * * *